United States Patent [19]

Derr

[11] Patent Number: 5,219,289

[45] Date of Patent: Jun. 15, 1993

[54] MATHEMATICAL TEACHING AID

[76] Inventor: Patricia K. Derr, 1653 Bentana Way, Reston, Va. 22090

[21] Appl. No.: 896,601

[22] Filed: Jun. 10, 1992

[51] Int. Cl.⁵ .............................................. G09B 23/02
[52] U.S. Cl. .................................... 434/211; 434/207; 434/191; 434/96; 434/212; 434/188
[58] Field of Search ................... 434/170, 207, 96–188, 434/191, 209, 211, 212, 259; 446/118

[56] References Cited

U.S. PATENT DOCUMENTS

| | | | |
|---|---|---|---|
| 1,571,488 | 2/1926 | Moisan et al. | 434/170 X |
| 3,479,751 | 11/1969 | Welbourn | 434/259 |
| 3,813,471 | 5/1974 | Dean, III | 434/170 |
| 4,286,952 | 9/1981 | Roche | 434/259 |
| 4,883,277 | 11/1989 | Laisure | 434/188 X |

FOREIGN PATENT DOCUMENTS

| | | | |
|---|---|---|---|
| 80483 | 1/1956 | Denmark | 434/209 |
| 172434 | 7/1906 | Fed. Rep. of Germany | 434/211 |

*Primary Examiner*—Gene Mancene
*Assistant Examiner*—L. Thomas

[57] ABSTRACT

A mathematical teaching aid or game comprising a background grid having components and subcomponents each positioned within individual cells of the grid so that many mathematical arrangements and concepts can be displayed. Each component has a face color from a set of colors and contains on its face the outline of a geometric shape from a set of geometric shapes. Each component represents a unique pairing of color and shape outline. Each subcomponent has a shape congruent to the shape outline from the set of shapes and matches exactly one component with respect to color and shape outline. The components are mounted upon the grid cells and the subcomponents can be mounted upon either a grid cell or upon a corresponding shape outline. Various arrangements of components and subcomponents on the grid can be made to illustrate numerous mathematical principles from elementary to advanced: shape/color recognition and matching; concepts of addition, subtraction, multiplication; factoring composite numbers; squaring numbers; factoring quadratics; distinguishing between prime and composite numbers; identifying factors common to composite numbers.

22 Claims, 12 Drawing Sheets

MATHEMATICAL TEACHING AID

FIELD OF THE INVENTION

This invention relates to the field of mathematical teaching aids and mathematical games which employ a background grid or matrix on which can be arranged components and subcomponents of various shapes and colors to illustrate mathematical principles.

PRIOR ART DESCRIPTION

It has been known for many years to use a background grid or matrix to mount, arrange, and display geometric shapes to teach mathematical concepts, spatial relationships and geometric concepts. Gilden et al U.S. Pat. No. 4,609,356 and a mathematical game named "Colorama", sold publicly in this country by Otto Maier Verlag of Ravenburg, Germany, are representative of prior art devices.

Applicant's distinction over the prior art lies in the use of a background grid or matrix having a number of cells upon which can be mounted components of certain colors and further having subcomponents of certain colors corresponding to the component colors. The subcomponents, being of certain shapes, are mountable upon the components or upon the grid cells. The shape of the subcomponents matches a like shape designated upon the outer face of the component. This unique combination of shapes and colors and their arrangement on the background grid is not taught by the prior art and allows the visual demonstration of mathematical relationships ranging from the simple to the complex in a form which is inexpensive, interesting, and highly instructive to the student.

OBJECTS AND ADVANTAGES OF THE INVENTION

Objects and advantages of the invention are to provide a new teaching aid; that is, to provide a teaching aid that clearly portrays mathematical concepts, elementary to advanced, using an apparatus that can be either concrete and inexpensive, or adapted to the computer media which is becoming ever more prevalent in the schools today, and which apparatus employs appealing colors and shapes in a mathematically meaningful way. The concreteness in which simple to complex mathematical concepts can be presented is especially important to conveying those concepts to the very young or those who have difficulty in grasping them completely in the abstract. Additionally, even though the use of concrete "manipulatives" to illustrate mathematical concepts is gaining acceptance in today's teaching methods, this teaching aid has an unusually large number of applications and gives a strong example of how to model mathematical principles. Further, this teaching aid engenders an appreciation for the esthetics of mathematics.

DESCRIPTION OF THE PREFERRED EMBODIMENTS

Figure 1:
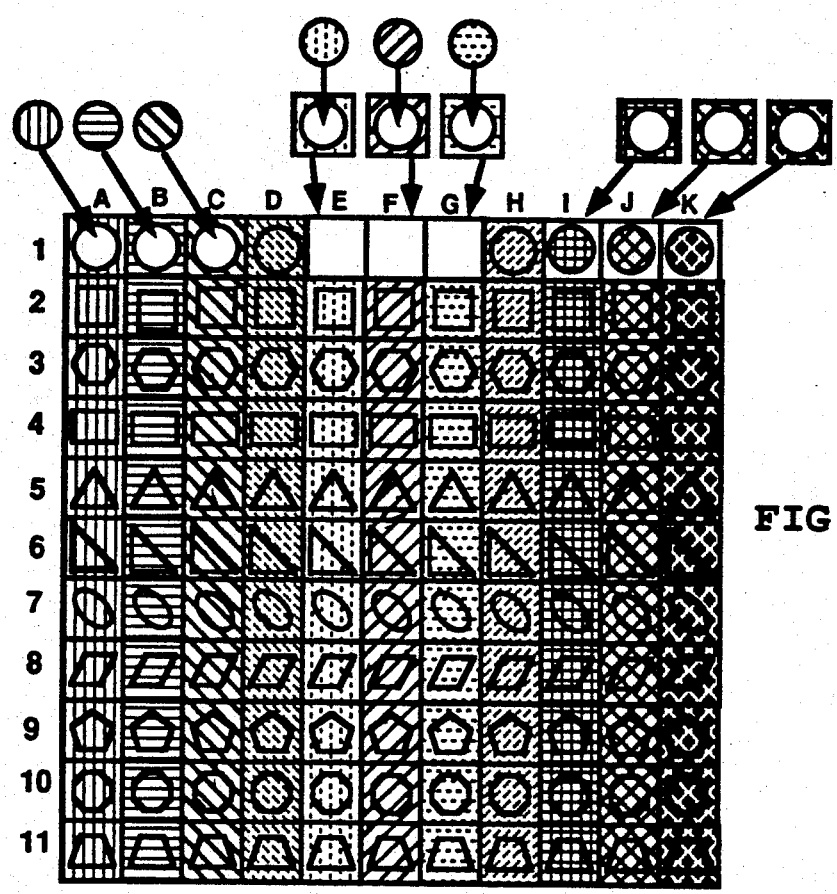
FIG. 1 is a top view of a grid on which are mounted square components with color and shape attributes. Each component has mounted upon it a shaped subcomponent. Each component matches exactly one subcomponent with respect to color and shape attributes. Colors on all drawings are show by different cross-hatchings.
Figure 2:
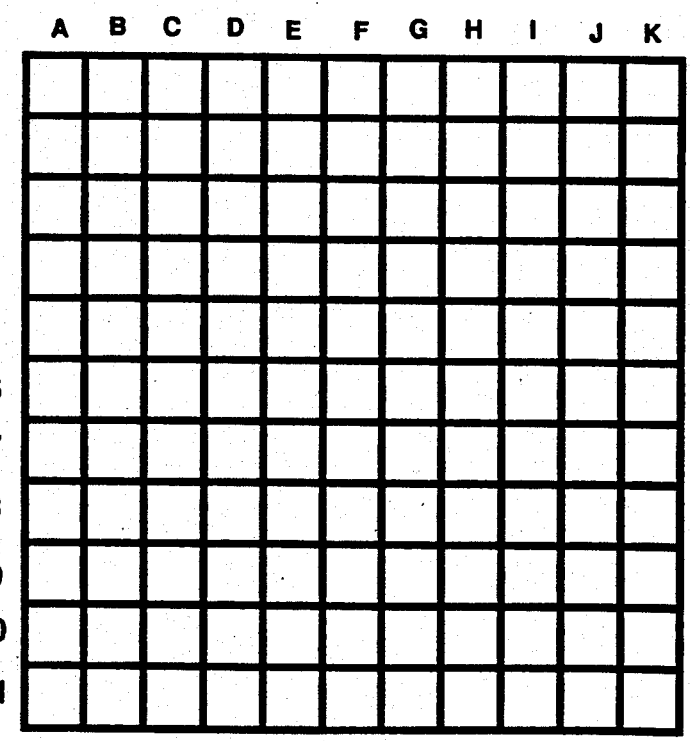
FIG. 2 is a top view of the grid with all components and subcomponents removed.
Figure 3:
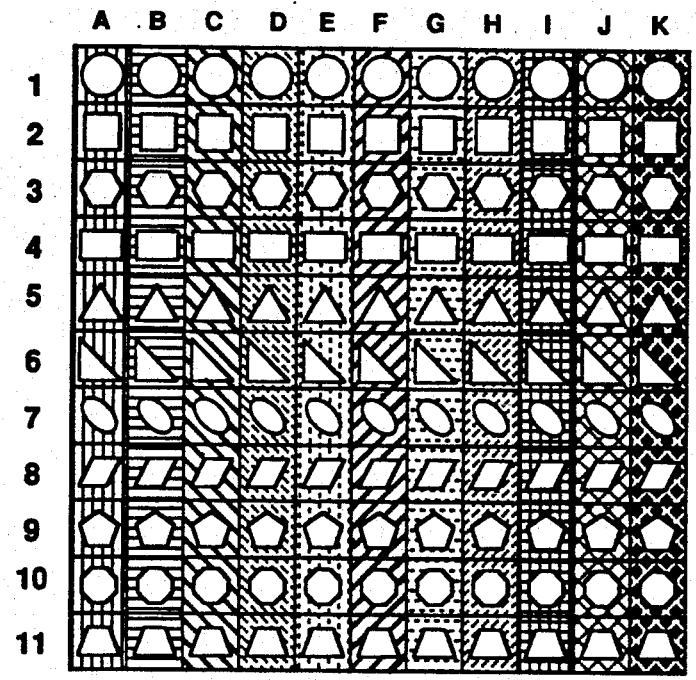
FIG. 3 is a top view of the grid with all components placed on the grid such that each cell is overlaid with a single component.

FIGS. 1-3 show the basic structure of the invention. A background grid or matrix is formed as shown in FIG. 2 on a generally flat surface which can be a sheet of plastic or cardboard or a designation on a video screen. The cells in the grid are designated by rows numbered 1-11 and columns lettered A-K.

Square components are provided as shown in FIG. 1 and can be mounted upon any grid cell by a variety of methods such as VELCRO, magnetic attraction, reusable adhesive, or simply placed upon the cell. The components are each of a coloration from a set of colorations which are shown by the different cross-hatchings in the figures and each further contains the outline on its outer face of a geometric shape selected from a set of geometric shapes. The shape outline can be drawn on the outer face of the component or can be formed by a depression or hole in the face of the component.

Subcomponents are provided, as shown in FIG. 1, each of a coloration selected from the set of colorations and each formed with a geometric shape selected from the set of geometric shapes. Each subcomponent is congruent to the geometric shape outline found on the outer face of a subset of the the components. The subcomponents can be mounted upon any component with an outline of a congruent shape or upon any grid cell by any of the methods described supra.

The mounting of the subcomponents upon the components and the components upon the grid is shown by the arrows in FIG. 1.

FIG. 3 shows all components mounted on the grid. Generally, there are an equal number of grid cells, components and subcomponents. However, the invention, as explained below, can be used with varying numbers of components or subcomponents on the grid.

The number of separate colorations in the given set of colorations from which the coloration of each component is obtained equals the number of separate shapes in the set of shapes from which a shape, whose outline is found on the outer face of each component, is obtained. This number also equals the number of rows in the grid and likewise the number of columns.

For each component the coloration and shape found on the outer face of the component is a unique pairing of that coloration and shape. For each possible pairing of coloration and shape from the given sets, there is exactly one component that has that coloration and that shape outline. Thus, the set of all components are a visual, concrete representation of the cross-product of a given set of colorations with a given set of shapes.

If the number of colorations in a given set is N, then, as previously specified, the number of shapes in the given set of shapes equals N. Likewise, the number of rows on the grid equals N; and the number of columns on the grid equals N. There are N×N possible unique pairings of colorations and shapes; there are N×N cells on the grid, as well. Therefore, there is a one-to-one correspondence between components and cells on the grid.

For each component there is exactly one subcomponent such that both component and subcomponent have the same coloration and the subcomponent has a shape that is congruent to the shape outlined on the outer face of the component. Since the subcomponents are in a one-to-one correspondence to the components with respect to coloration-shape pairs, the set of subcomponents are similarly a second and complete representation of the cross-product of the set of colorations with the set of shapes.

As the following description of FIGS. 4-24 shows, this unique pairing of the shapes and colorations of the components and subcomponents upon the grid can be used to teach or demonstrate a large variety of mathematical concepts ranging from the simple to the complex.

FIGS. 4 TO 24

The various ways the teaching aid of FIGS. 1-24 is used can best be described with reference to the specific figures showing that use as follows.

Figure 4:
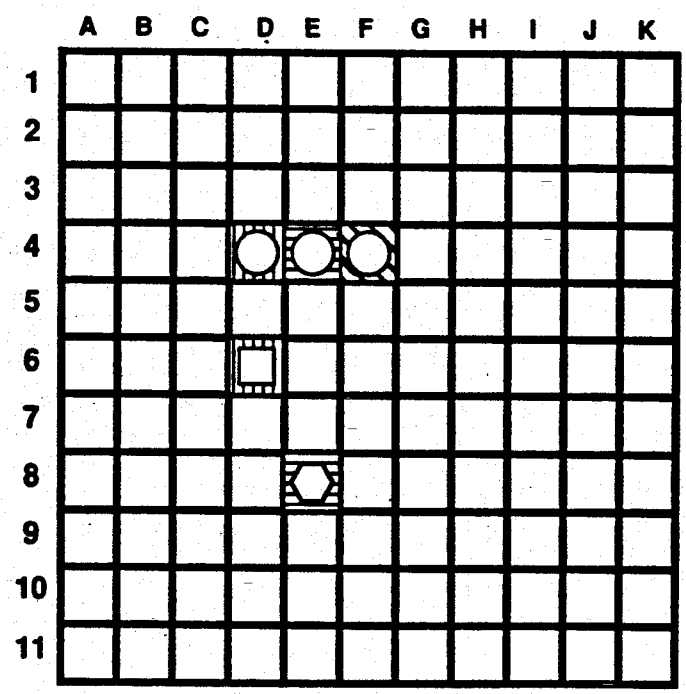
FIG. 4 is a view of the grid and selected components showing a linear pattern puzzle to be solved by choosing additional components and placing them in appropriate cells of the grid.
Figure 5:
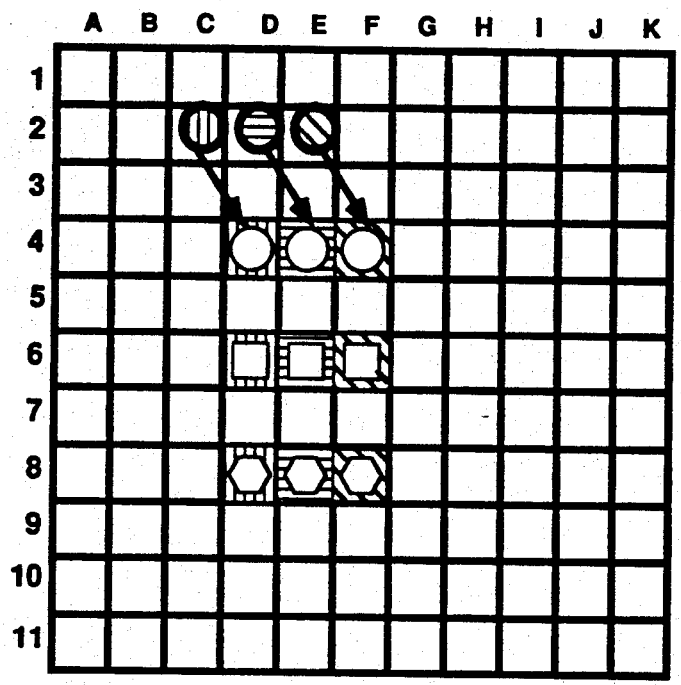
FIG. 5 is a view of the solution of the pattern puzzle illustrated by FIG. 4.
Figure 6:
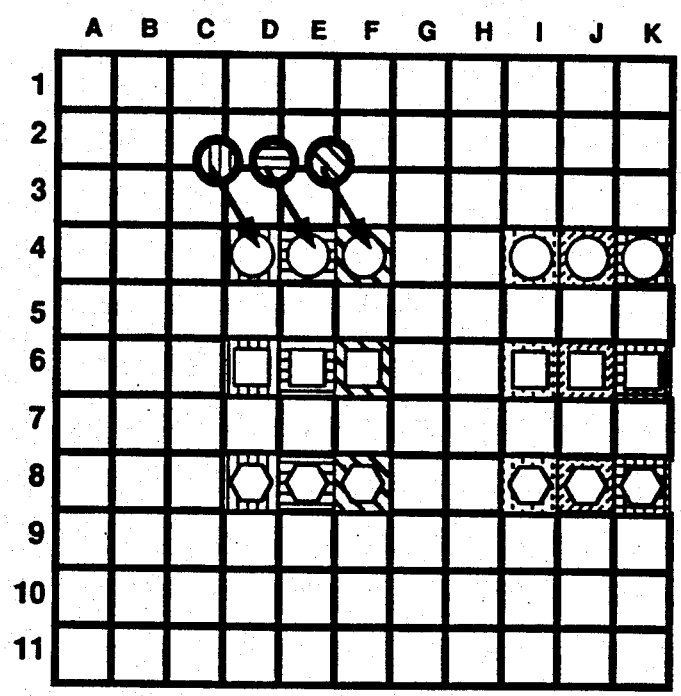
FIG. 6 is a view of the original linear patterns of FIG. 5 together with a set of three additional linear patterns that each consists of a row of three components, with each component having its color attribute from one of three new colors. Each component's shape attribute is picked from the set of the three shapes used in the original set of linear patterns. These components are arranged such that the new set of linear patterns imitates the original set by ordering color uniformly in each pattern.

FIG. 4 to FIG. 6: For elementary or pre-school children to observe a variety of linear patterns composed of components arranged horizontally or vertically; to construct similar patterns with additional components; and to complete the matching of subcomponents to components; and thus to learn, with tactile and visual reinforcement, the concepts of linear patterns and one-to-one correspondence, the former being helpful to incipient recognition of spatial relationships, and the latter being intrinsic to the definition of a function.

For example, in FIG. 4, contiguous cells of the grid, 4-D, 4-E, and 4-F, each contain a components, each of a different single color, all having imprints of a same geometric shape; in our example, this shape is a circle. This linear pattern is to be imitated by the child in cells 6-D, 6-E, and 6-F of the grid using components having the imprinted shape of an square; and, in cells 8-D, 8-E, and 8-F, the child imitates the pattern using components with the imprinted shape of a regular hexagon. FIG. 5 shows the completion of these two separate, linear patterns. These two patterns preserve the order of colors established by the original linear pattern in cells 4-D through 4-F. Thus, the child has seen the concept of ordering members of a set: in this case, the set of three colors. The order of colors remains constant over a varying choice of imprinted shape. Also, at this point, a puzzle has been created which the child can then fill by placing individual subcomponents to the component with the same color and congruent shape as shown in FIG. 5.

The three linear patterns from FIG. 5 can be imitated using components having shape outlines that are the same as those used in the first set of patterns: in the case of our example, the circle, square, and hexagon; but the components are colored with a single color chosen from another subset of three colors. The set of original patterns and resulting set of new patterns (cells 4-I through 4-K, 6-I through 6-K, and 8-I through 8-K) are shown in FIG. 6 preserve the order of color and shape. Again, the concepts of color and shape matching, grouping and ordering are reinforced by the child matching subcomponents to components with respect to color and shape attributes.

Figure 7:
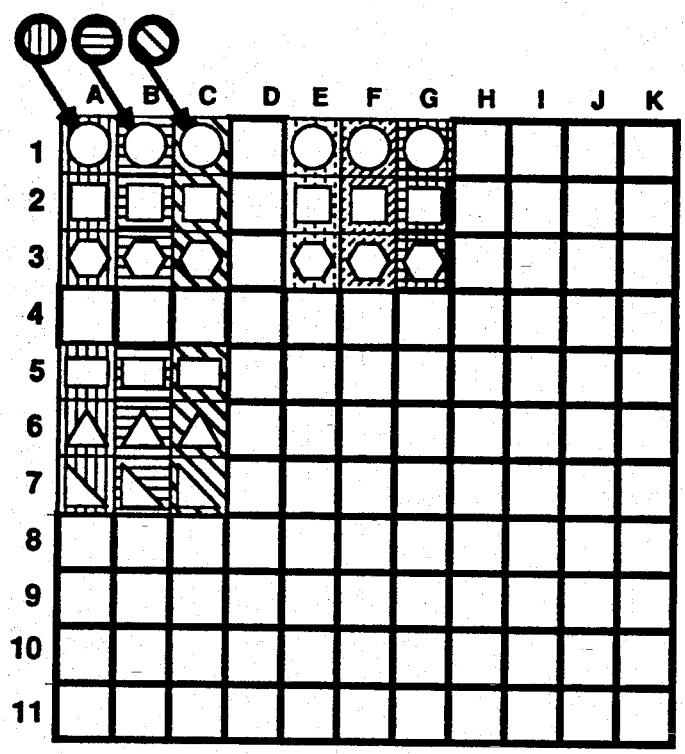
FIG. 7 is a view of the original and second set of linear patterns both individually consolidated into planar patterns. Additionally, there is a third planar pattern consisting of components with individual color attribute selected from one of the three colors occurring in the original set and shape attribute selected from a set of shapes not occurring in the original set.

FIG. 7: Elementary school children can combine linear patterns into planar arrangements; and thus learn, with tactile and visual reinforcement, the transition from one-dimension to two. Planar patterns can assist in presenting concepts of ordered pair and the coordinization of a finite plane. For instance, continuing with our example given in FIG. 6, the child can consolidate these related linear patterns into planar patterns consisting of three rows (1 through 3 and 5 through 7) and three columns (A through C and E through G) within the grid. Thus, the child sees the transition from one dimension (linear) to two dimensions (planar). Just as the child saw how members of a set of colors can be ordered in the linear patterns, here the child sees how members of a set of shapes are ordered. The order of shapes within each column remains constant: circle, square, hexagon. As before, the order of colors within each row remains constant: wine-red (cells 1-A, 2-A, and 3-A), royal blue (cells 1-B, 2-B, and 3-B), forest green (cells 1-C, 2-C, and 3-C). The child can then see how the location "blue-circle" is logically placed at the insection of the row of circles with the column of blue shapes and therefore is in cell 1-B. Thus, the child can visually experience the concept of coordinatizing a two-dimensional (planar) area so that individual locations are specified by a unique ordered-pair: (blue, circle), (green, square), etc.

FIG. 7 also shows that this teaching aid allows elementary school children to observe planar patterns composed of components arranged in rows and columns, and to construct similar patterns with additional components; and to complete the matching of subcomponents to components. The child thus learns, with tactile and visual reinforcement, the concept of spatial relationships in the plane and furthers his/her experience with one-to-one relationships. For example, a child can be challenged to develop a third planar pattern that consists of components colored with a single hue from the set of three colors chosen for the first planar pattern and the outline of a shape from a set of three shapes available within the prototype, but mutually exclusive with the set of shapes initially chosen. The results of developing such a pattern are shown in FIG. 7, in cells 5-A through 5-C, 6-A through 6-C, and 7-A through 7-C.

Figure 8:
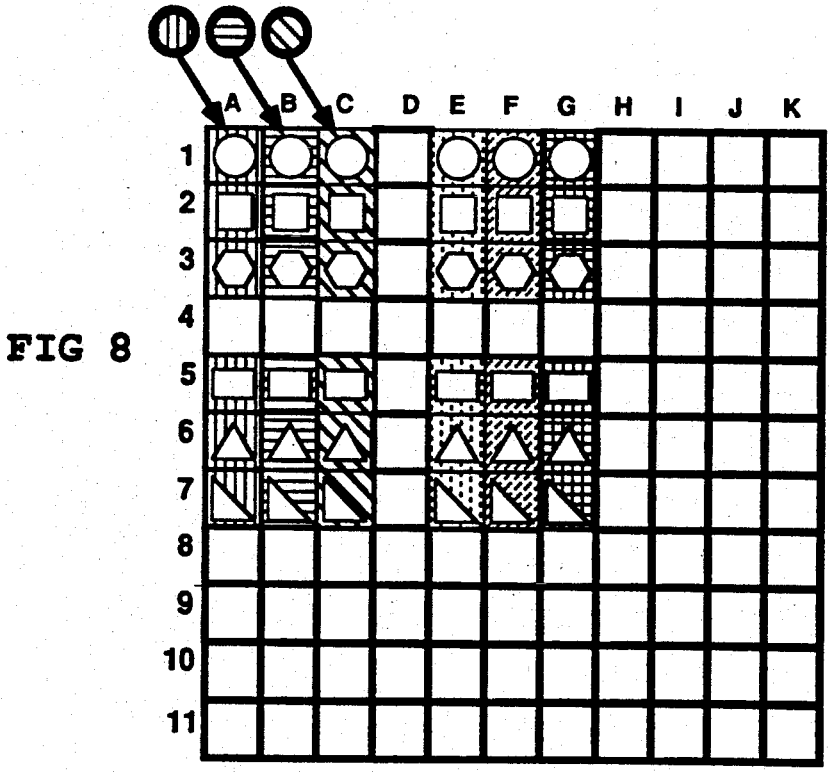
FIG. 8 is a view of the first three planar patterns together with a fourth planar pattern that contains components each having a color attribute occurring in components in the second planar pattern and a shape attribute occurring in components in the third planar pattern.

FIG. 8: A child can further be challenged to devise a fourth planar pattern by obtaining components colored with a hue from the second group of three colors and that contain the outline of a shape from the second group of three shapes. The child arranges them in a two-dimensional pattern that preserves the order of color and shape established by the preceding patterns. This fourth two-dimensional pattern is found in cells 5-E through 5-G, 6-E through 6-G, and 7-E through 7-G.

Each new pattern creates yet another puzzle for the child to complete by matching subcomponents with respect to color and shape. Thus, while creating two-dimensional patterns that imitate other patterns, the child also creates puzzles that he, she or another child can complete. Completion of these puzzles illustrates the concept of one-to-one correspondence.

Figure 9:
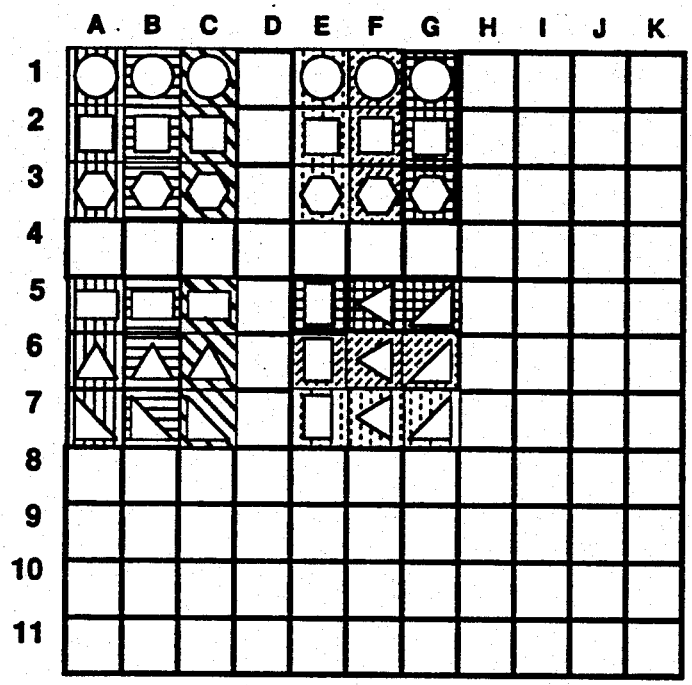
FIG. 9 is a view of the four planar patterns formed previously, but with the fourth pattern turned ninety degrees counterclockwise as a unit, and also with each individual component turned ninety degrees counterclockwise.

FIG. 9: Children from elementary to intermediate school levels can rotate a pattern consisting of several components any multiple of 90 degrees and further demonstrate their understanding of spatial relationships. For example, a child can be challenged to rotate the two-dimensional pattern in FIG. 8 [bounded by rows 5 and 7 and columns E and G] 90 degrees counterclockwise. Before rotation, components in each column have the same color; components in each row all contain the outline of the same shape. After rotation, components in a given row have the same color; components in a given column have the outline of the same shape. The point to emphasize is that the color occurring on components in column E (the left-most column of the pattern) prior to rotation, now occurs on components in row 7 (the bottom row); the color that occurred on components in column F (the middle column of the pattern) now is found on components in row 6 (the middle row); the color that occurred on components in column G (the right-most column) is now found on components in row 5 (the top row). Dually, the shape whose outline was found on components in row 5 (the rectangle) now occurs on components in column E; the shape previously found on components in row 6 now occurs on components in column F; and the shape found in row 7 now is found in column G. So the colors went from col. E to row 7, from col. F to row 6, from col. G to row 5; the shapes went from row 5 to col. E, from row 6 to col. F, and from row 7 to col. G. Examining the results of the transformation caused by rotation gives the child an appreciation of how different variables (color and shape outline) are affected by the operation. This visual experience builds a base from which the child will be able to deal with problems of rotation in calculus and physics.

In addition, children can rotate individual components integral multiples of 90 degrees and observe differences in orientation of the geometric shape whose outline occurs on that component. Rotation of components results in a visually different orientation of the shape outline on the component depending upon the symmetry of that shape with respect to a rotation that is an integral multiple of 90 degrees. For example, of the figures used in the rotation of the pattern, the rectangle, the equilateral triangle, the right, isosceles triangle, all evince the 90 degree rotation. The child can experiment with rotating components 90 degrees clockwise as well as 180 degrees, 270 degrees, clockwise and counterclockwise to see if there is a visual difference in the orientation of the shape whose outline is found on each component. Using all the shapes found in the prototype, the child discovers how the circle, square, and octagon do not visually change orientation with rotation; how the hexagon, rectangle, ellipse, and parallelogram have two visually distinct orientations with successive 90 degree rotations; and how the trapezoid, equilateral triangle, isosceles right triangle, and pentagon have four distinct orientations with successive 90 degree rotations. For further emphasis, the child can match subcomponents to components, completing the puzzle, or only matching those that may have been rotated a specific multiple of 90 degrees. This exercise will strengthen the child's capabilities to analyze spatial relationships.

Figure 10:
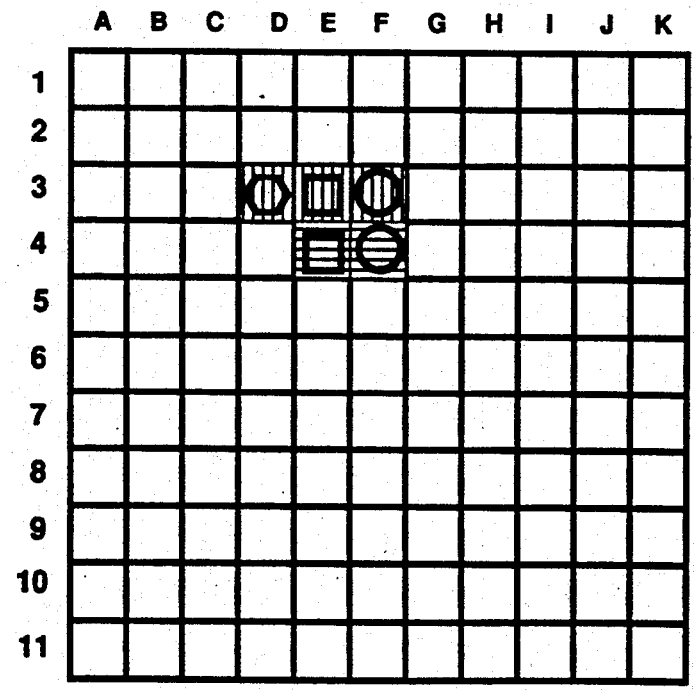
FIG. 10 is a view of components and subcomponents arranged to illustrate a simple addition problem.
Figure 11:
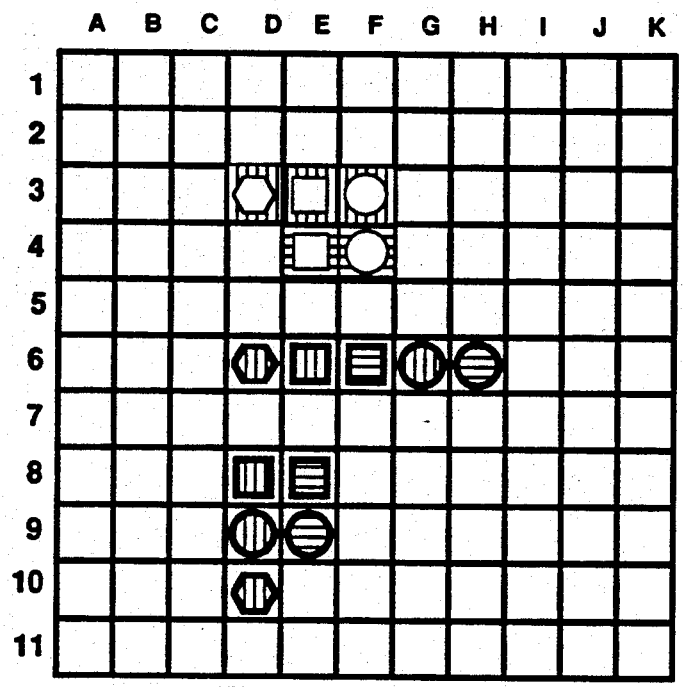
FIG. 11 is a view of components and subcomponents arranged to illustrate the solution of the problem posed in FIG. 10.

FIGS. 10 and 11: Children can express arithmetic statements representing simple sums by arranging components and matching subcomponents and to see equivalent truths that occur within these arrangements such as: 3+2=5 and also that 2+2+1=5. To express this particular sum, the child or teacher chooses components in the following manner:

1. Since there are two addends in our example, designate two colors of components.
2. Designate shapes, the number of which equals the value of the largest addend. In the example, the largest addend equals 3, so designate the shapes hexagon, square, and circle.
3. Find all components (and corresponding subcomponents) that are both (a) colored with one of the designated colors and (b) contain the outline of one of the designated shapes. All components and subcomponents used in the arithmetic expression are chosen from this group.
4. Form a representation of the largest addend by placing components from the group of gathered components that are all of one color and the number of which is equal to the value of the largest addend in a row of contiguous cells on the grid (FIG. 10, cells 3-D, 3-E, and 3-F).
5. Form a representation of the second addend in row 4 by placing chosen components of the second color with shapes square and circle (or any other combination of square, circle, hexagon) so the number of chosen components equals the value of the second addend. Place these components in cells 4-E and 4-F (FIG. 10) so any column of occupied cells contains components having the outline of the same geometric shape.
6. Match subcomponents to all utilized components with respect to color and shape.

This completes the process of choosing components and subcomponents and placing them on the grid to express the addition exercise of 3+2. In the following steps, the child solves the exercise:

1. Remove matched subcomponents from each component one by one, beginning with the left-most cell of the row containing the components for the largest addend and continuing to the right across the first row (FIG. 11, Row 3, columns D through F). Place all removed subcomponents in a single unoccupied row on the grid (FIG. 11, Row 6).
2. When all subcomponents have been removed from the first row, continue removing subcomponents by starting with the left-most subcomponent of the second row (FIG. 11, Row 4), and proceed to the right. Place removed subcomponents from the second row in the same row (Row 6) with removed subcomponents from the first row.
3. Count each removed subcomponent by starting with the value of "1"; the child ends with the natural number that is the value of the sum.

This completes the calculation. Note that use of this teaching aid:

Presents the value of the sum with the removed set of subcomponents placed in contiguous cells in a vacant row on the grid while it preserves the visual representation of the addends with the original arrangement of components.

Emphasizes pictorially to the child how addition involves forming the union of two or more sets, with the number of sets equaling the number of addends, and how the resulting sum is the total number of members of the union.

Allows the child or teacher to rearrange the addends to express a different expression, but one algebraically equivalent to the first. For instance, the child arranges the subcomponents in rows such that each row contains subcomponents having the same shape; and each column contains subcomponents with the same color. Thus, an expression such as 3+2 is represented as 2+2+1 (Cells 8-D and 8-E (=2 . . . ); 9-D and 9-E ( . . . +2 . . . ); and 10-D ( . . . +1)).

Thus, use of this teaching aid allows the child to compare the subcomponents' rearrangement to the initial configuration of components. This process of comparison demonstrates equivalent algebraic expressions.

Figure 12:
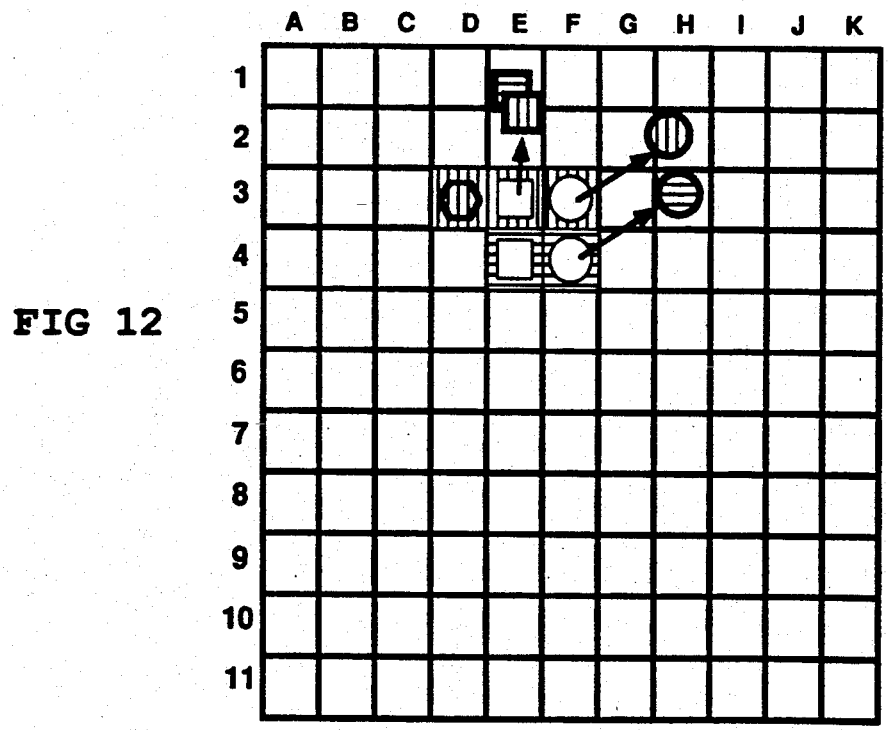
FIG. 12 is a view of components and subcomponents arranged on the background grid and showing an intermediate step in solving a simple subtraction problem.
Figure 13:
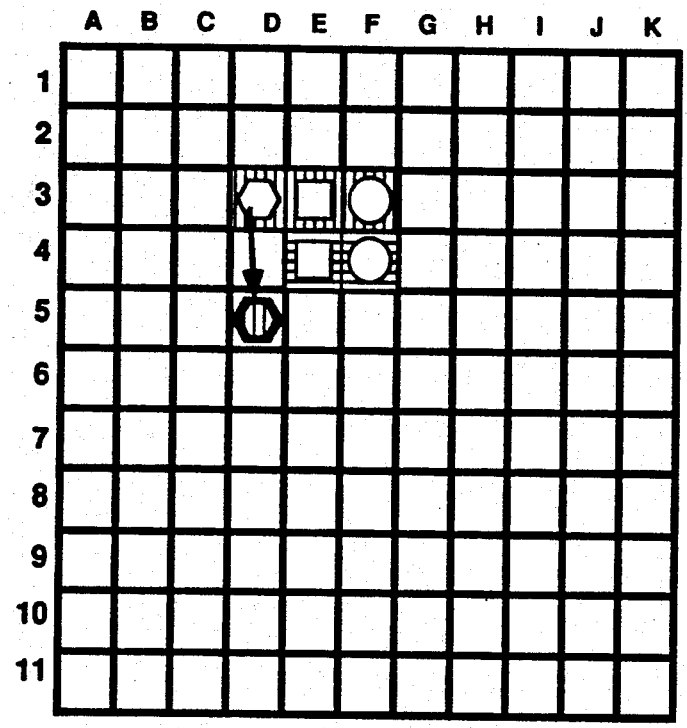
FIG. 13 is a view of components and subcomponents arranged on the background grid to show the final step in solving a simple subtraction problem.

FIGS. 12 and 13: To illustrate a problem of subtraction, namely "3−2," components and subcomponents are arranged exactly as for addition. However, to complete the calculation, subcomponents are removed in a one-to-one fashion; that is, the subcomponents having the same shape in rows 3 and 4 are removed as a pair. First the squares in cells 3-E and 3-F (FIG. 12) are removed; then the circles in 4-E and 4-F are removed. This leaves the hexagon in cell 3-D as the only subcomponent that has no matching subcomponent (with respect to shape) in another row. The child places the left-over subcomponent in an unoccupied row (FIG. 13, Row 5) beneath the components. By counting these unmatched subcomponents, the child finds the answer to the initial calculation (in the example, 1 subcomponent).

Figure 14:
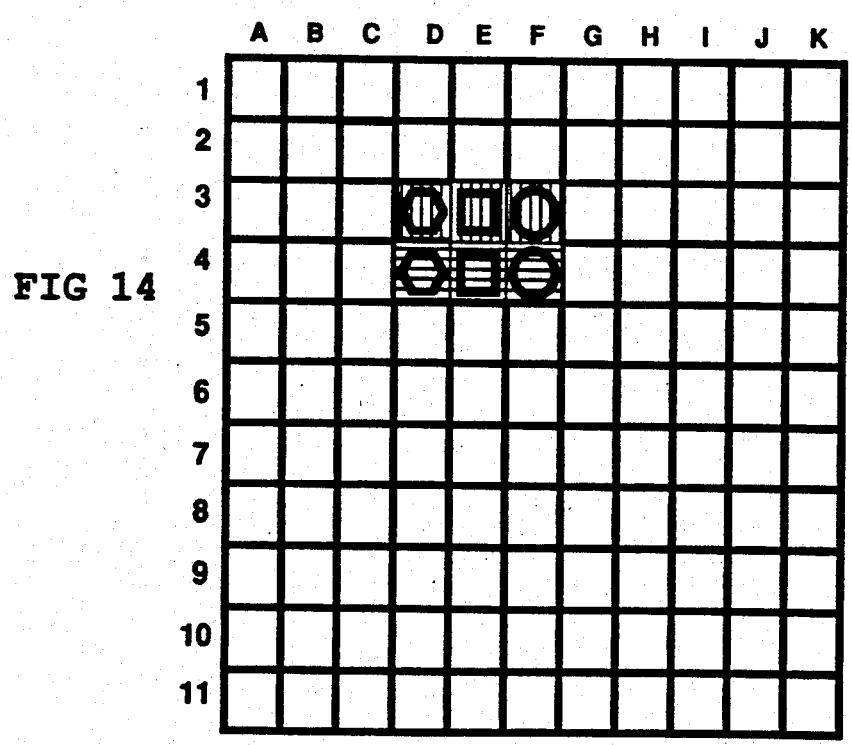
FIG. 14 is a view of components and subcomponents arranged on the background grid to illustrate a simple multiplication problem.
Figure 15:
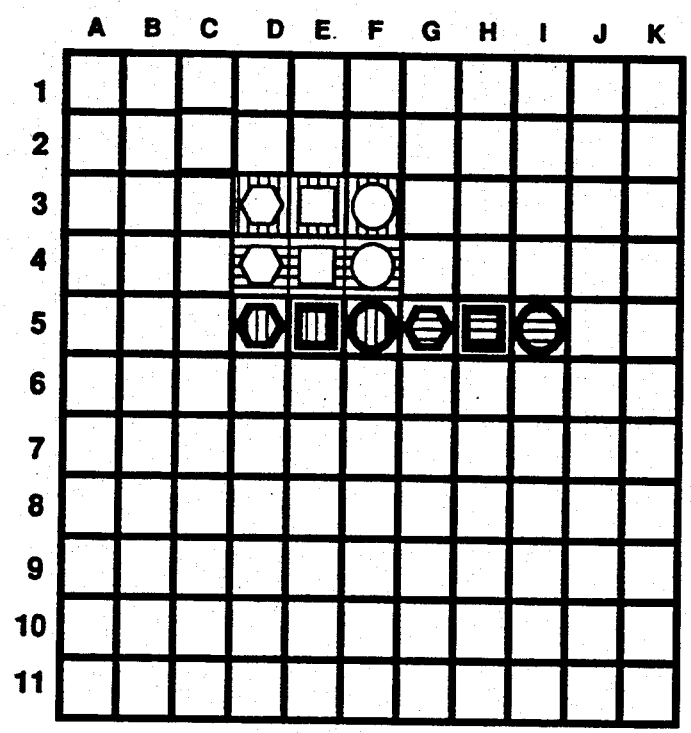
FIG. 15 is a view of the subcomponents rearranged on the background grid to illustrate the solution to the multiplication problem posed in FIG. 14.

FIGS. 14 and 15: The child visually experiences that a statement of addition becomes one of multiplication when each addend has equal value.

In the example from FIGS. 10 and 11, the addends are 3 and 2 and therefore, are not equal. That means that one of the components gathered to express the initial calculation and that satisfies the conditions that it has one of two chosen colors and contains the outline of one of the three chosen shapes has not been used: in this case, the second color's component containing the outline of the hexagon.

The teacher can explain to the child that when this component is placed in its appropriate cell on the grid (under the first color's component containing the outline of a hexagon and adjacent to the second color's component containing the outline of a square in cell 4-D) that then the total arrangement of components expresses not only the addition problem of 3+3 but also that of the multiplication problem: 2×3. That is, an addition problem is also a multiplication problem when the addends are equal. This teaching aid visually reinforces this concept with an arrangement of rows of components, each row containing an equal number of components, with one row for each addend. The number of rows signifies the multiplier (equaling 2 in our example), and the number of components in each row signifies the multiplicand (equaling 3). First, the child finds and matches subcomponents to each component with respect to color and shape; the result of this matching is found in FIG. 14. Second, the child removes each subcomponent counting until the total is reached, placing each removed subcomponent in contiguous cells of a row unoccupied by any of the components, and thus completing the calculation. Our example is 2×3=6. The result of this problem is found in FIG. 15.

Figure 16:
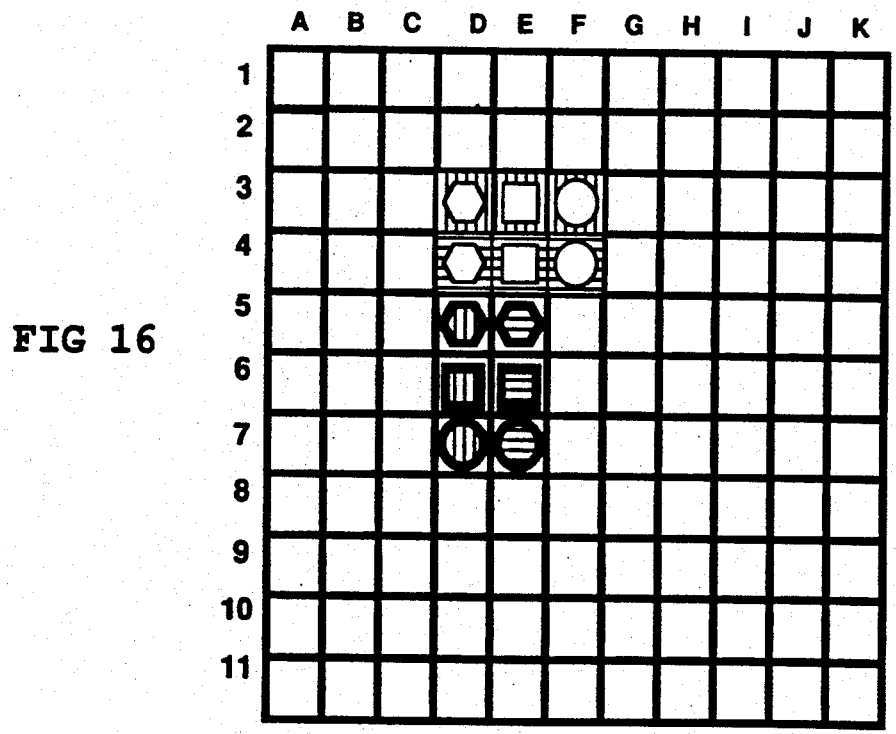
FIG. 16 is a view of the subcomponents rearranged on the background grid which together with the stationary components illustrate the commutative law of multiplication. All components and subcomponents are the same as those used in the previous two figures.

FIG. 16: Elementary school children experience the commutative law of multiplication tactually and visually by rearranging the subcomponents from how they are in FIG. 15.

In our example [2×3 (the number of rows times the number of components in each row)=6 (the number of subcomponents removed from all components)], the teacher illustrates or assists the child in illustrating that $2\times3=3\times2$ which is an instance of the commutative property of multiplication. The child is challenged to arrange the subcomponents in another way (separate from the components) so that the subcomponents in the same row do not have the same color. Independently, or with help, the child places the subcomponents as in FIG. 16, so that subcomponents in the same row have the same shape and those in the same column have the same color. This arrangement reverses the way those attributes are arranged for the components. Therefore, the arrangement is read as 3 (the number of rows) times 2 (the number of subcomponents in each row): $3\times2$. The child compares this with 2 (the number of rows of components) times 3 (the number of components in each row): $2\times3$. Since the child knows from previous matching that there is a one-to-one correspondence between components and subcomponents, he/she sees that $2\times3=3\times2$. This equality utilizes the commutative property of multiplication.

Figure 17:
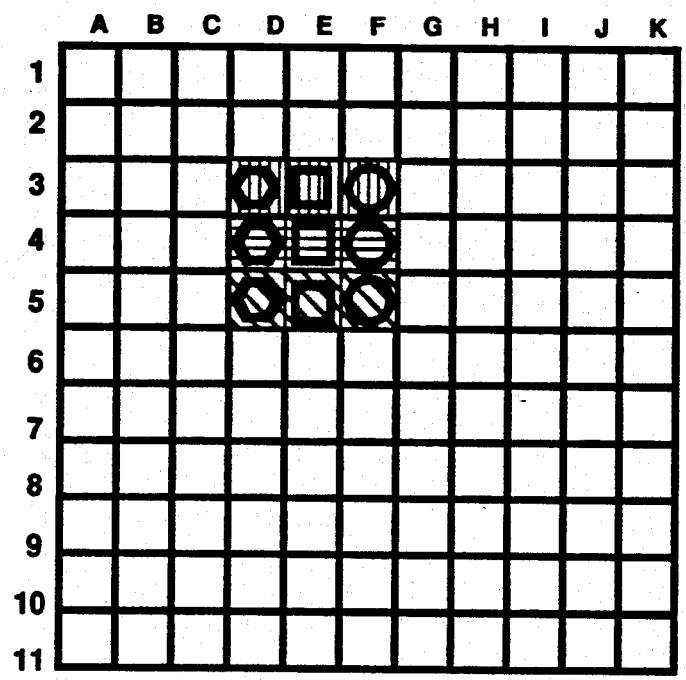
FIG. 17 is a view of components and subcomponents arranged to illustrate a problem to calculate the value of $x^2$.
Figure 18:
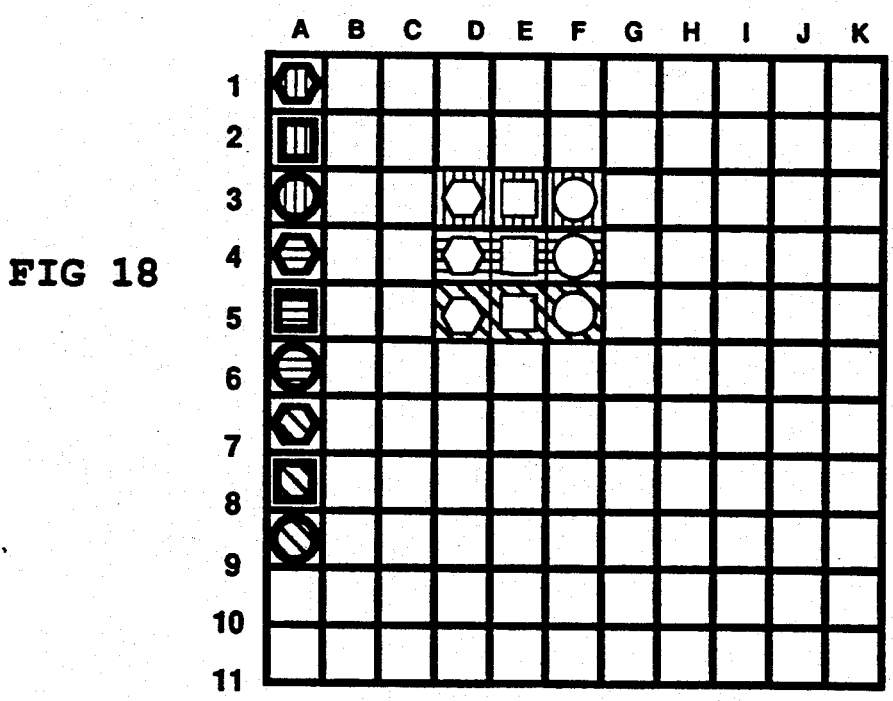
FIG. 18 is a view of the subcomponents rearranged to illustrate the solution of the problem in FIG. 17.
Figure 19:
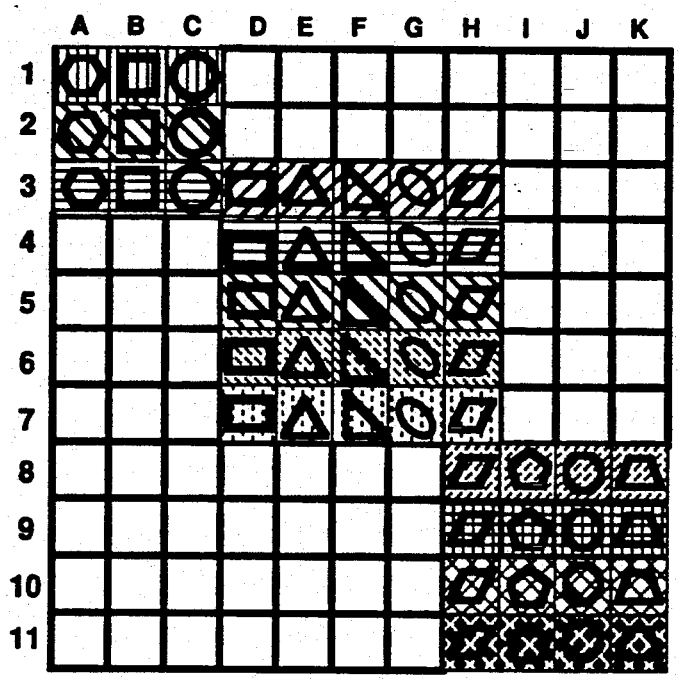
FIG. 19 is a view of components and subcomponents arranged to illustrate the concept of $x^2$ for three different values of x.

FIGS. 17, 18 and 19: Children from elementary to intermediate school levels see that the square of number occurs when the multiplier equals the multiplicand in a multiplication problem. Use of this teaching aid results in a visual "square" when illustrating this concept.

The teacher asks the child, "If we go from addition to multiplication by making the value of each addend the same, what happens when we make the number of rows equal to the number of columns?" In our example, the problem $2\times3$, with the addition of 3 more components, becomes $3\times3$ which is also written $3^2$ and which is said "3-squared" or "3 to the power of 2." This teaching aid offers the child an opportunity to experience this exponential operation by identifying a third color, say forest green, and then finding all forest-green components containing the outline of any of the same three shapes previously used: the square, the rectangle, and the octagon. The child then arranges these components in contiguous cells in a third row directly beneath the first two rows (FIG. 17, Cells 5-D through 5-F) so that components in an individual column still all contain the outline of the same shape. This results in an obviously square arrangement of components, reflecting the "square" of the number, in this case, 3. All subcomponents are again matched with respect to color to their mating components. Then they are removed one-by-one, and placed linearly on a row or column of the grid separate from the arrangement of components (FIG. 18, Cells 1-A through 9-A) with the child counting each until the total is obtained and the calculation is completed ($3\times3=9$). This teaching aid presents the result of this calculation, i.e. the nine subcomponents that embody the 9 possible combinations of color and shape, while preserving the initial arrangement of components that visually states the problem: 3 colors $\times$ 3 shapes. Also, this visually represents the algebra problem: $3X\times3Y=9XY$. By using this device, the child experiences a visual, tactile proof that $3X\times3Y=9XY$ rather than the common error $3X\times3Y=3XY$.

FIG. 19 shows the configuration of components and subcomponents set up to calculate $x^2$ for $x=3, 4,$ or $5$.

Figure 20:
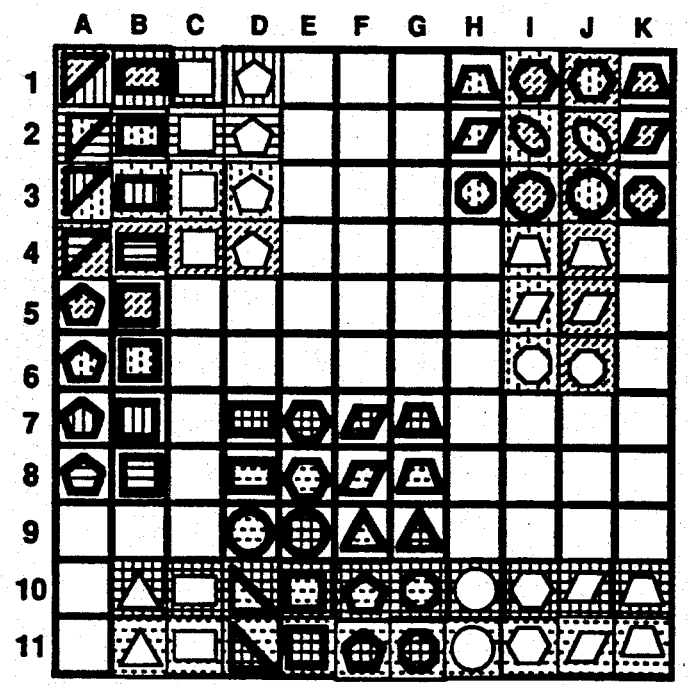
FIG. 20 is a view of components and subcomponents arranged to illustrate different factorizations of various values.

FIG. 20: The teaching aid is used to show elementary and intermediate school children two different ways of factoring a number simultaneously. As shown in cells 1-A through 1-D, 2-A through 2-D, 3-A through 3-D, and 4-A through 4-D, components utilizing four colors and outlines of four different shapes are arranged to express the value $4^2$. The child finds all matching subcomponents and mounts them on the appropriate component to emphasize the one-to-one correspondence between components and subcomponents. (This step is not shown.) Then the child is challenged to rearrange the subcomponents to express the same value, i.e. 16, such that the subcomponents reside in an equal number of contiguous cells occurring in the same columns of contiguous rows, one subcomponent per cell. The rearrangement results in subcomponents arranged in 8 rows of 2 cells each (cells 1-A, 2-B, 2-A, 2-B, 3-A, 3-B, ..., 8-A, 8-B), thus illustrating that $4\times4=8\times2$.

Another example of two ways to factor the same number occurs in the upper, right-hand portion of the grid where components employing 2 colors and outlines of 6 different shapes are arranged in 6 rows of two cells each (cells 1-I, 1-J, 2-I, 2-J, 3-I, 3-J, ..., 6-I, 6-J). Again, subcomponents are matched to each component with respect to color and shape. (Not shown.) Then, the child rearranges the subcomponents to occupy a different number of contiguous rows, such that each row contains an equal number of subcomponents, one subcomponent occupies a utilized cell, and all utilized cells are contiguous. This example illustrates that $6\times2=3\times4$.

A final example found in rows 10 and 11 of this figure is constructed similarly and illustrates that $2\times10$ equals $5\times4$. This device is valuable in presenting equivalent factorizations of numbers by giving the child a visually meaningful representation of both sides of the equivalence simultaneously.

The components and subcomponents as arranged in rows 10 and 11 also can be seen to illustrate the distributive property. Reading from left to right, the placement of the subcomponents on components in cells 10-D through 10-G and 11-D through 11-G divide the components into groups 2, 4, and 4 in each of these two rows. Thus, there are $2\times(2+4+4)$ components in these two rows. The child can see that there are $2\times2$ components without subcomponents in cells 10-B, 10-C, 11-B, and 11-C, $2\times4$ components with subcomponents in cells 10-D, 10-E, 10-F, 10-G, 11-D, 11-E, 11-F, and 11-G, and $2\times4$ components without subcomponents in cells 10-H, 10-I, 10-J, 10-K, 11-H, 11-I, 11-J, and 11-K. To summarize, these components and subcomponents illustrate this instance of the distributive property: $2\times(2+4+4)=(2\times2)+(2\times4)+(2\times4)=4+8+8=20$.

Figure 21:
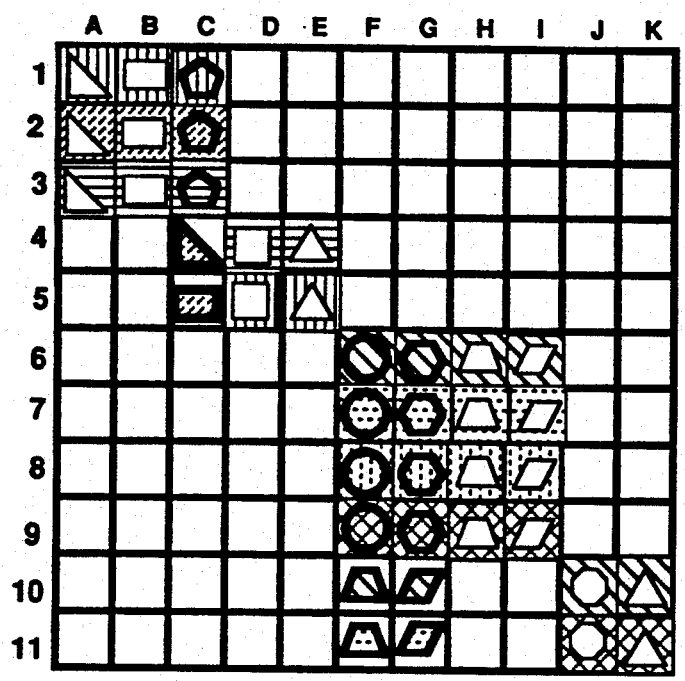
FIG. 21 is a view of components and subcomponents illustrating quadradic expressions and their factorizations.

FIG. 21: For secondary school students, this teaching aid models quadratic expressions and their factors. The teaching aid illustrates the factorization $x^2-y^2=(x+y)(x-y)$ in rows 1 through 5 and columns A through E on the grid by letting $x=3$ and $y=2$. The value of $x^2$ is represented by components employing 3 colors and the outlines of 3 different shapes; these components are placed as shown in cells 1-A, 1-B, 1-C, 2-A, 2-B, 2-C, 3-A, 3-B, and 3-C. Similarly, $y^2$ is represented by components employing 2 colors and the outlines of 2 different shapes; these components are placed in cells 4-D, 4-E, 5-D, and 5-E. All subcomponents matching these components are placed each placed on the appropriate component (not shown). The subtraction of the $y^2$ term is performed by removing each subcomponent from the $y^2$ components, and as each is removed, a subcomponent from an $x^2$ component is also removed (not shown). Therefore, $y^2$ subcomponents are removed from both the $y^2$ and the $x^2$ terms. The number of subcomponents remaining on $x^2$ components is the value of the difference. In the example, the result equals 5. The 5 remaining subcomponents are arranged in 5 (=x+y) rows of 1 (=x−y) cells per row. Thus, the value of $x^2-y^2$ is shown as both a difference and a product, illustrating a common quadratic factorization.

A second illustration of factoring this same quadratic is shown in rows 6 through 11 and columns F through K on the grid. In this example, x=4 and y=2. Following the same procedure, the remaining subcomponents are arranged in 6 contiguous rows of occupying 2 contiguous cells of the grid in each row. Thus, again, the value of $x^2-y^2$ is shown to be the product (x+y)(x−y), which is (4+2)(4−2) in this instance.

Figure 22:
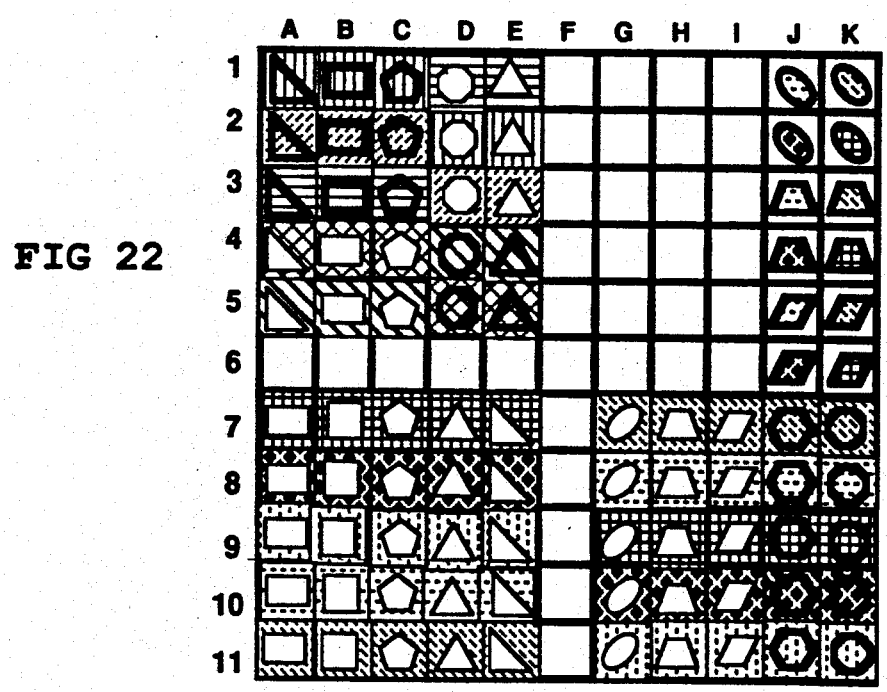
FIG. 22 is a view of components and subcomponents arranged to illustrate other quadratic relationships.

FIG. 22. Secondary school students use this teaching aid to prove visually that the value of $(x+y)^2=x^2+2xy+y^2$. To illustrate this algebraic truth, let x=3 and y=2, and choose components and subcomponents and place them on cells of the grid as shown in rows 1 through 5 and columns A through E. Since x+y=3+2 in our example, and the value of this sum equals 5; and since $5^2=25$, 25 components are chosen and placed in the cells 1-A through 1-E, 2-A through 2-E, . . . , and 5-A through 5-E. The components collectively form a square which reinforces the quantity-squared concept. Furthermore, components are arranged to represent $x^2$ (=$3^2$) in cells 1-A through 1-C, 2-A through 2-C, and 3-A through 3-C; $y^2$ (=$2^2$) in cells 4-D, 4-E, 5-D, and 5-E. Components representing the quantity xy (x times y), which in this instance is 3×2, are placed in cells 1-D, 1-E, 2-D, 2-E, 3-D, and 3-E. Components representing the quantity yx (y times x), which in this instance is 2×3, are placed in cells 4-A, 4-B, 4-C, 5-A, 5-B, and 5-C. (When the student cross-multiplies (x+y)(x+y), he/she obtains the two like terms, xy and yx, which are combined into the single middle term 2xy.) Subcomponents are only placed on matching components for components employed in representing the squared terms, $x^2$ and $y^2$. This distinguishes the squared terms visually. Such use of this teaching aid offers a vibrant proof that $(x+y)^2=x^2+2xy+y^2$ rather than the common error that $(x+y)^2=x^2+y^2$.

In the bottom half and right-hand portions of the figure, components and subcomponents are arranged to illustrate the quadratic factoring $2x^2-5x-3=(2x+1)(x-3)$. Let x=5. Then $x^2=5^2=25$, and $2x^2=50$. Choose components to illustrate $2x^2$ as shown in cells 7-A through 7-E, 8-A through 8-E, . . . , 11-A through 11-E (for one $x^2$) and cells 7-F through 7-K, 8-F through 8-K, . . . , 11-F through 11-K (for the second $x^2$). Place matching subcomponents in all components (not shown). Since the remaining terms are subtracted, take subcomponents from the components on the grid (rather than adding more components and matching subcomponents). The number of subcomponents removed equals 5x (=5 times 5=25) as well as 3 additional subcomponents. The remaining 22 subcomponents can arranged in 11 rows in 2 contiguous cells each, illustrating that the quadratic is factored into (2x+1)(x−3) or (2 times 5+1)(5−3) which is 11×2.

Figure 23:
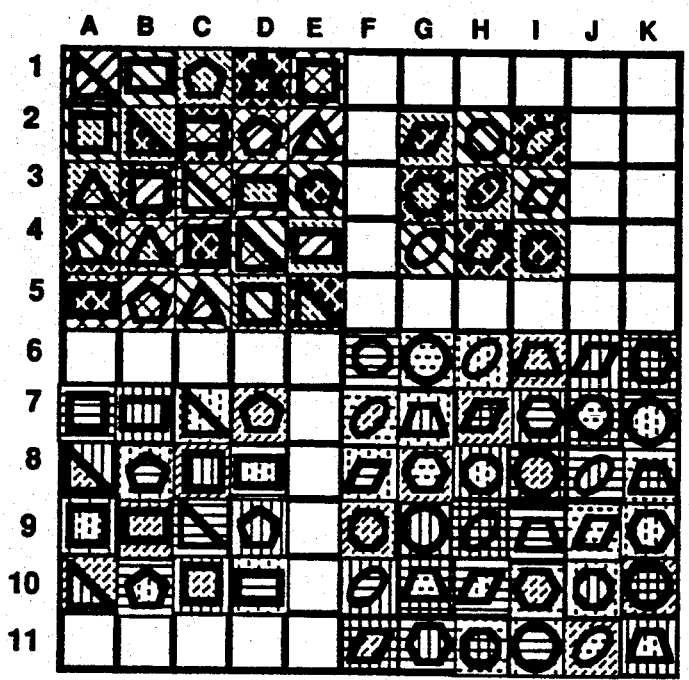
FIG. 23 is a view of components and subcomponents arranged to illustrate factorization of prime and composite numbers.

FIG. 23: The teaching aid offers to the secondary and collegiate student an opportunity to study properties of prime versus composite numbers.

The teaching aid [the grid, together with the components and subcomponents, both being a representation of the cross-product of color- and shape-sets] is ideal for showing mathematically meaningful concepts as illustrated by a pattern called a Latin Square. A Latin Square is a matrix having the same number of rows as columns such that the cells of that matrix contain entities chosen from a set whose cardinality is the same as the number of rows (or columns) and such that each row and each column contains all entities from the set (one per cell) and each entity occurs exactly once in each row and each column. This discussion will give several examples of patterns that either succeed or fail to be Latin Squares with respect to 3 characteristics: color of component, shape whose outline occurs on the component, and color of subcomponent. Whether the pattern succeeds or fails to be a Latin Square yields mathematical properties about the number which is the order of the matrix housing the pattern. All patterns discussed here are generated as cyclic patterns; that is, each successive row is a repeat of the preceding row in that the order of the entities is maintained. However, a given offset is used so that the entity (component color, shape, subcomponent color) in the first cell occurred in the 1+offset cell of the preceding row. The entity in the first cell of the preceding row occurs in the n−o+1 cell of the current row (where n is the order of the matrix and o is the offset), thus giving a "wrap-around" or cyclic effect. Numbers follow cyclic patterns in modular arithmetic, an area of finite mathematics.

Such cyclic patterns are constructed in the square matrix of order 3 housed by cells 2-G, 2-H, 2-I, 3-G, 3-H, 3-I, 4-G, 4-H, and 4-I. The 3 colors of components are arranged in a cyclic Latin Square with offset equal to 3−1=2. When the offset is one less than the order of the matrix, the entities (such as component color) occur diagonally from left to right down the rows. The 3 shapes outlined on components are arranged in a cyclic Latin Square with offset equal to 1. When the offset is 1, the entities occur diagonally from right to left down the rows. Note that with respect to color and outline shape, each entity occurs exactly once in each row and each column. In both instances, the definition of a Latin Square is satisfied. In a matrix of order n, there are only n−1 possible offsets. Therefore, there is no third possible offset (greater than 0) to create a Latin Square with respect to subcomponent color. In addition, the cyclic Latin Squares created with respect to component color and shape outline are mutually orthogonal: that is, each component color is paired with a shape outline exactly once, and all such possible pairings occur. This is a direct result of the components being constructed as a physical representation of the cross-product of colors and shapes. For a number n, there are p−1 mutually orthogonal, cyclic Latin Squares that can occur simultaneously, where p is the smallest prime factor of n, the order of the matrix. Indeed, in our example of a matrix, with n=3 and p=3, when the subcomponents are matched to the shape outline on each component, the same offset as that for component must be used. So, even if the order of the colors is changed from that of the component color, and a Latin Square is obtained, it will not be mutually orthogonal to that of the colors of the components because the pairings of component color and subcomponent color are not unique (as seen in cells 2-G and 3-H). Therefore, we obtain p−1 (3−1=2) mutually orthogonal Latin Squares (occurring with offsets 1 and 2) simultaneously.

The square matrix of order 4 in rows 7 through 10 and columns A through D houses cyclic patterns such as those described for the matrix of order 3, chosen from a set of 4 colors and outlines of 4 shapes. Note that, whereas 3 has 3 as its smallest prime factor, and we are able to construct 3−1=2 mutually orthogonal Latin Squares simultaneously, 4, being equal to 2×2, has 2 as its smallest a prime factor. Since 2−1=1, that is how many cyclic Latin Squares that are mutually orthogonal that can occur simultaneously. In other words, we cannot obtain even 2 mutually orthogonal, cyclic Latin Squares simultaneously. But some other mathematically meaningful concepts occur.

First, components are placed so that the offset with respect to component color is 1 and the offset with respect of shape outline on the component is 2. The resulting pattern is a cyclic Latin Square with respect to component color: i.e. each component color occurs in each row and each column exactly once. However, the cyclic pattern constructed with respect to shape outline is not a Latin square. In fact, the pattern is divided into 2 repeating sections: the positions of the shapes in rows 7 and 8 repeat themselves in rows 9 and 10. Note that the order of the matrix (4) and the offset (2) share the factor of 2, thus the pattern is divided into 2 repeating sections. If the offset with respect to one attribute is not relatively prime to the order of the matrix, the pattern housed within that matrix is divided into f repeating sections of n/f rows each where f is the factor common to both the order of the matrix, n, and the offset.

If we had attempted an offset of 4−1=3 with respect to shape outline, then the component in 8-A would have the same color but the shape outline would be a pentagon; in 8-B, a square; in 8-C, a rectangle; in 8-D, a triangle; then in 9-A, the shape would be a triangle; however, that component occurred already in cell 7-C. Given the construction of the device a second component with the same color-shape outline combination is not available. Hence we cannot construct two mutually orthogonal cyclic Latin Squares with respect to component color and shape outline based on the offsets 1 and 4−1=3. This is because the difference between 3−1=2 is not relatively prime to 4.

The offset with respect to subcomponent color equals 3, and we successfully create a cyclic Latin Square with respect to this entity because, unlike shape outline, subcomponent color is not physically dependent on component color and can be repetitively paired with it. However, we see that the pairings of component color and subcomponent color are not unique and hence the two Latin Squares are not mutually orthogonal. Moreover, the repetitions in how the two are paired occurs in the first cell of row 9. Therefore, all unique pairings occur in rows 7 and 8, and are repeated with an offset of 2 in rows 9 and 10. Again the matrix is divided into 2 parts because 3−1=2 is not relatively prime to 4 and the matrix is divided into as many parts as the largest factor common to both 2 and 4 (i.e. 2).

Continuing with the matrix of order 6 housed on the grid in cells of rows 6 through 11 and columns F through K, we see that the offset with respect to component color is 1, the offset with respect to shape outline on component is 2 and the offset with respect to subcomponent color is 3. The resulting patterns end up being cyclic Latin Squares with respect to component color only. The pattern obtained with respect to shape outline of component is possible because the difference in offsets (1−2=−1=5 mod 6) is relatively prime to 6. However, since the offset 2 shares the factor of 2 with the order of the matrix, the matrix is divided into 2 sections (of 3 rows each) with the each shape occurring in a cell in the second section the same as the shape occurring in the same relative position in the first section. For example, the shape occuring in cell 9-A is the same as that occurring in cell 6-A. Similarly for subcomponent color, the offset 3 shares the factor of 3 with the order of the matrix, and thus the matrix is divided into 3 sections (of 2 rows each) with the same subcomponent color occurring in corresponding cells of each section. See cells 6-A, 8-A, and 10-A.

Besides the offsets themselves, the value of their differences also divides the matrix. For example, the offset with respect to component color=1 and the offset with respect to subcomponent color=3. Their difference=2 and 2 and 6, the order of the matrix, share the factor 2. So, the matrix is divided into 2 sections (of three rows each). All unique pairings occur in the first section and are repeated in the second section (with an offset of 3). For instance, the pairing of component color and subcomponent color that occurs in cell 9-F occurred previously in cell 6-I. From that point on the pairings in subsequent cells in the second section mimic those in subsequent cells in the first section.

Therefore, in regard to composite versus prime numbers, the cyclic patterns that we can create with this teaching aid distinguish between the two and further, help identify factors of composites and common to two composites.

Further evidence of how this teaching aid illuminates the behavior of prime numbers is found in the square matrix of order 5 occupying cells 1-A through 1-E, 2-A through 2-E, . . . , and 5-A through 5-E. Three cyclic Latin Squares are constructed with offsets 1 with respect to component color, 5−1=4 with respect to shape outline on each component, and 2 with respect to subcomponent color. All three offsets result in a Latin Square and all three Latin Squares are simultaneously, mutually orthogonal. That is, all pairings with regard to component color and shape outline, and with regard to subcomponent color and subcomponent shape are mutually orthogonal by physical construction. In addition, the pairings with regard to component color and subcomponent color are also mutually orthogonal (i.e. unique and comprehensive) which is evident by visual inspection. There are p−1 mutually orthogonal cyclic Latin Squares simultaneously possible for prime number p. Since 5 is a prime number, there are 4 such patterns. This teaching aid has the power to illustrate 3 such patterns simultaneously. Students can explore the innate differences between prime and composite numbers by using this teaching aid to obtain visual evidence of those differences.

Figure 24:
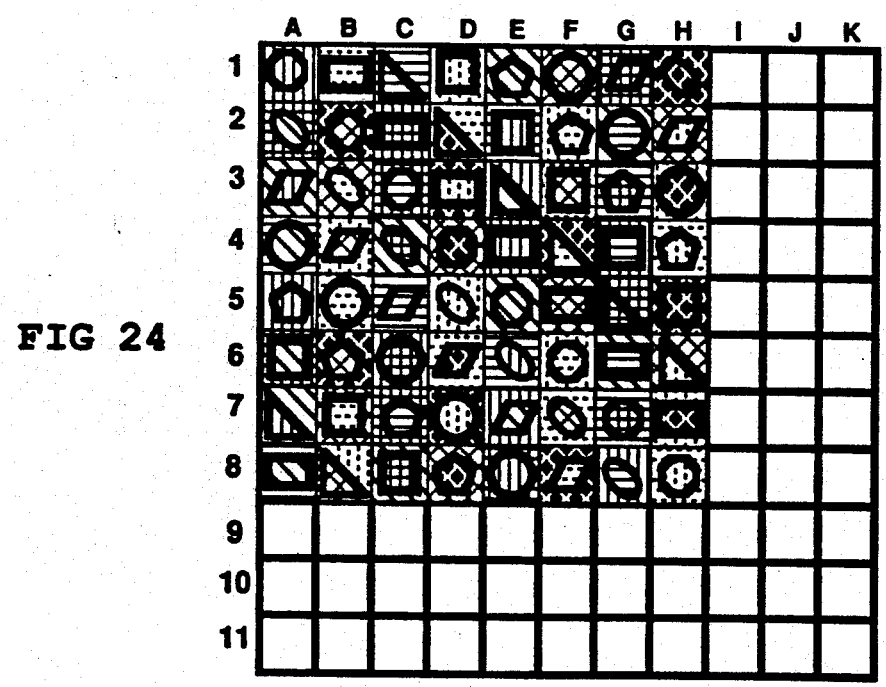
FIG. 24 is a view of components and subcomponents arranged to illustrate common factors of prime and composite numbers.

FIG. 24: Another example of factoring a composite number and identifying factors common to two numbers is found in this figure. A cyclic pattern is constructed in a matrix similarly as those in FIG. 23. The order of this matrix is 8: i.e., there are 8 rows and 8 columns. The offset with respect to component color is 6, the offset with respect to shape is 7, and the offset to subcomponent color is 4. The resulting patterns show that the design with respect to shape results in a Latin Square and therefore, 7 and 8 are relatively prime. On the other hand, the design with respect to component color is not a Latin Square and divides the matrix into 2 sets of four rows each such that component colors are repeated in exactly the same order in each of these 2 groups. Therefore, 8 and 6 have 2 as their greatest common factor. The design with respect to subcomponent color divides the matrix into 4 groups of two rows each such that the colors are repeated in the same order in each of these 4 groups. Therefore, 8 and 4 have 4 as their greatest common factor.

BREADTH OF INVENTION AND RAMIFICATIONS

While the above description contains many specificities, these should not be construed as limitations on the scope of the invention, but merely as an example of the presently-preferred embodiment thereof. Many variations of the invention are possible.

For example the number of components and, therefore, the number of subcomponents, the number of rows, and the number of columns of cells on the grid, can be varied. The set of shapes and colors from which the attributes are chosen for the components and subcomponents can be varied. The size of the grid would vary accordingly. The size and materials for the device overall can be varied from large displays, suitable for the front of the classroom, to more compact versions feasible for both home and school use. This instructional aid can be built from cardboard or magnetic vinyl or from other hands-on materials. It lends itself to computer representation as well, where components and subcomponents are "dragged" via a "mouse", or otherwise directed via keyboard or hand-held input device, to various positions on the grid. An implementation of the uses of this teaching aid may employ a game-like approach that challenges the child to make the next correct move toward completing the puzzle so that the resulting configuration of components and subcomponents on the grid illustrate a specific mathematical principle.

Accordingly, the full scope of the invention should be determined, not by the examples given, but by the appended claims and their legal equivalents.

I claim:

1. A mathematical teaching aid comprising a background grid having at least nine individual grid cells arranged in a matrix; said mathematical teaching aid further comprising at least three components each attachable to any cell of the background grid and each being of a separate color, and each of said components further having an outer face surface with a separate geometric shape outlined on such outer face surface; and at least three subcomponents each being only one of the separate colors of said components and having a geometric shape at least similar to only one of the separate geometric shapes outlined on said component outer face surface, each of said subcomponents being attachable at said outer face surface of any component with a geometric shape outline similar to the geometric shape of said subcomponent.

2. A mathematical teaching aid comprising a background grid having at least nine individual grid cells arranged in a matrix; at least three removable and replaceable components having an outer peripheral shape and each attachable to any grid cell of the grid, each of said removable and replaceable components having a separate and distinct coloration and an outer surface and further having a separate and distinct shape which is visibly outlined on said outer surface and being in area less than that of the area of the outer peripheral shape; at least three subcomponents, each of said subcomponents having a separate and distinct coloration corresponding to only one of the separate and distinct colorations of said components and each of said subcomponents having a separate and distinct shape similar to only one of the separate and distinct shapes outlined on said outer surface of said components, any of said subcomponents being removeably and replaceably fitted to any component having a separate and distinct shape outline which is similar to the separate and distinct shape of the subcomponent.

3. The mathematical teaching aid of claim 2 wherein the subcomponents are each attachable to any grid cell without the presence of a removeable and replaceable component.

4. The mathematical teaching aid of claim 2 wherein said separate and distinct shape outlined on the component is formed as a cavity in said outer surface of said component, the separate and distinct shape of said subcomponent nesting within the said cavity so that the subcomponent at least partially fits into the component.

5. The mathematical teaching aid of claim 2 wherein said visably outlined separate and distinct shape contains the center of said outer peripheral shape of said component and the separate and distinct shape of said subcomponent being congruent to said outlined shape.

6. The mathematical teaching aid of claim 2 wherein a pair consisting of any one of said components and the corresponding one of said subcomponents are attachable to any grid cell by means of a reusable fastener consisting of two fabric sides.

7. The mathematical teaching aid of claim 6 wherein said pair has similarity of outer surface shape outline of said component and said shape of said subcomponent.

8. The mathematical teaching aid of claim 2 wherein a pair consisting of any of said components and the corresponding one of said subcomponent are attachable to any grid cell by means of reusable adhesive.

9. The mathematical teaching aid of claim 8 wherein said pair has similarity of outer surface shape outline of said component and said shape of said subcomponent.

10. The mathematical teaching aid of claim 2 wherein a pair consisting of the corresponding one of said components and any one of said subcomponents are attachable to any grid cell by means of magnetic materials.

11. The mathematical teaching aid of claim 10 wherein said pair has similarity of outer surface shape outline of said component and said shape of said subcomponent.

12. The mathematical teaching aid of claim 2 wherein the said grid cells are arranged in rows and columns to form a square.

13. The mathematical teaching aid of claim 2 wherein the number of said separate and distinct shapes of said subcomponents equals the number of separate and distinct colorations of said subcomponents.

14. The mathematical teaching aid of claim 2 wherein the number of separate and distinct colorations of said components and of said subcomponents are equal.

15. The mathematical teaching aid of claim 14 wherein the number of said separate and distinct shapes outlined on the outer surface of said components equals the number of separate and distinct shapes of said subcomponents and further equals the number of separate and distinct subcomponent colorations.

16. The mathematical teaching aid of claim 2 wherein the number of subcomponent shapes equals the number of component colors.

17. The mathematical teaching aid of claim 1 wherein every possible pairing of said separate and distinct corresponding colorations and said separate and distinct corresponding shapes is found in exactly one component and exactly one subcomponent thereby visually demonstrating mathematically that the set of all components represents the cross-product of the set of said colorations and the set of said shapes and that the set of all subcomponents are in one-to-one correspondence with the set of all components with respect to a unique pairing of coloration and shape.

18. The mathematical teaching aid of claim 2 wherein there are an equal number of components and grid cells.

19. The mathematical teaching aid of claim 2 wherein the background grid, components, and subcomponents are constructed on a video screen.

20. The mathematical teaching aid of claim 2 wherein the background grid, components, and subcomponents are projected on a screen.

21. The mathematical teaching aid of claim 2 wherein the number of components is greater than three and the number of subcomponents is greater than three and there being recurrences of at least some of said separate and distinct corresponding colorations and of at least some of said separate and distinct similar shapes but there being only one possible pairing of component and subcomponent with both having the same corresponding coloration and both having similar shape.

22. The mathematical teaching aid of claim 1 wherein the number of components is greater than three and the number of subcomponents is greater than three and there being recurrences of at least some of said component and subcomponent colors and of at least some of the geometric shapes of said component outer face outlines and said subcomponents but there being only one possible pairing of component and subcomponent with both having the same color and both having similar geometric shapes.

* * * * *